United States Patent [19]

Schmitt et al.

[11] Patent Number: 5,353,834
[45] Date of Patent: Oct. 11, 1994

[54] CHECK VALVE

[75] Inventors: Edgar Schmitt, Vaihingen/Enz; Heinz Siegel, Stuttgart; Manfred Wilhelm, Nussdorf; Georg Kehl, Stuttgart, all of Fed. Rep. of Germany

[73] Assignee: Robert Bosch GmbH, Stuttgart, Fed. Rep. of Germany

[21] Appl. No.: 127,034

[22] Filed: Sep. 24, 1993

[30] Foreign Application Priority Data

Oct. 29, 1992 [DE] Fed. Rep. of Germany ....... 4236481

[51] Int. Cl.$^5$ ............................................. F16K 15/04
[52] U.S. Cl. ............................. 137/539.5; 137/543.19
[58] Field of Search ..................... 137/533.13, 533.17, 137/533.19, 539, 539.5, 543.19

[56] References Cited

U.S. PATENT DOCUMENTS

| 833,559 | 10/1906 | Stebbins | 137/533.19 |
|---|---|---|---|
| 2,649,277 | 8/1953 | Blackford | 137/543.19 X |
| 2,904,065 | 9/1959 | Butlin | 137/543.19 X |
| 3,053,270 | 9/1962 | Campbell | 137/539.5 X |
| 3,830,255 | 8/1974 | Freiheit | 137/543.19 |
| 3,913,615 | 10/1975 | Cooper | 137/543.19 |
| 3,932,898 | 1/1976 | Wright | 137/533.13 X |
| 4,310,018 | 1/1982 | Parr et al. | 137/539.5 |
| 4,700,741 | 10/1987 | Murphy | 137/539 X |
| 5,193,579 | 3/1993 | Bauer et al. | 137/543.19 X |

FOREIGN PATENT DOCUMENTS 968435 11/1950 France ............................ 137/543.19

Primary Examiner—John Rivell
Attorney, Agent, or Firm—Edwin E. Greigg; Ronald E. Greigg

[57] ABSTRACT

The invention relates to a check valve, for use as an insert check valve, with a valve seat and a valve element that is resiliently prestressed against the valve seat by a valve spring. According to the invention, a retaining element embodied as a retaining bracket is provided, which supports the end of the valve spring remote from the valve element and the retaining element can be locked resiliently to a recess, particularly an annular groove, of the valve housing. This enables fast, simple assembly of the check valve from its individual parts.

6 Claims, 2 Drawing Sheets

CHECK VALVE

BACKGROUND OF THE INVENTION

The invention is based on a check valve, as described in U.S. Pat. No. 3,725,990, for instance. In such a check valve, a valve element, which is typically embodied as a ball, is pressed against a valve seat by means of a valve spring, which is generally embodied as a helical spring, and often as a conical helical spring; the valve seat is provided in a valve housing in order to close a valve opening surrounded by the valve seat as long as a pressure of a pressure fluid acting upon the valve body via the valve opening is inadequate to lift the valve element from the valve seat counter to the engaging spring force. Accordingly, at a pressure more or less accurately defined by the spring force selected, a check valve opens at the valve opening, which at lesser pressures, and independently of the level of the pressure whenever the pressure fluid acts on the opposite side of the valve element from the valve opening, it blocks this valve opening. Depending on the intended use, or as a function of the adjoining components of a hydraulic or pneumatic system, the valve housing may take various forms; the valve housing of U.S. Pat. No. 3,725,990 mentioned above is used to make so-called insert check valves, which are inserted directly into a pressure fluid conduit or line, and are relatively simple in design and can be embodied by a cuplike sheet-metal housing, for instance, which is flanged inward on its end remote from the valve seat in order to form a support surface for the end of the spring remote from the valve element, or for a plate or the like supporting this end of the spring.

For a flow regulating valve, which is moreover intended as an insert valve and in addition to the usual components of a check valve includes an actuating device with whose aid a ball-like valve element can be lifted in a defined way from the valve seat regardless of the height and orientation of the pressure fluid pressure, it is also known from German Offenlegungsschrift 24 23 643 to embody the valve housing as a relatively heavy and bulky die-cast housing or the like, and to use a housing in the form of a cuplike cage as a support for the compression spring acting upon the valve element; the pressure spring can be supported on the bottom of the cage, and its open end is press-fitted form-fittingly into an annular groove of the valve housing, causing permanent deformation of the cage material.

In the known check valves of the type described above, which by the use of an additional actuating device can optionally be used as flow regulating valves, it has proved to be a problem that when the valve parts are assembled to make a functional valve, at least one component of the valve must be permanently deformed—in the case of the valve of U.S. Pat. No. 3,725,990, this is the edge on the open side of the cuplike valve housing, while in the valve of German Offenlegungsschrift 24 23 643, it is the open end of the cuplike cage serving as a support for the compression spring. The consequence is that the production of the individual parts of the valve, on the one hand, and the assembly of the finished valve on the other cannot be separated from one another either in terms of space or time, and in the final analysis the deformation steps and deforming tools determine the rate and precision of the assembly. Moreover, final quality control cannot be done until after the final assembly or final completion of the known valves.

OBJECT AND SUMMARY OF THE INVENTION

Based on the prior art and the problems discussed above, an object of the invention is to disclose an improved check valve that can be manufactured simply and inexpensively, and which in particular can be assembled automatically in an ABS and an ASR brake and drive system.

This object is attained by a check valve according to the invention the advantage is attained in that all the components of the valve are first completely produced, and can be checked in this condition for whether they meet quality requirements, and that the assembly of the valve can then be done in a simple automatic assembly process, in which none of the components of the valve are permanently deformed any longer, so that the operations involving purely assembly can be performed automatically with high precision and at high speed.

In a feature of the invention, the advantageous opportunity exists in particular of embodying the recess for the resilient locking of the retaining element to the valve housing as an annular groove, because such an annular groove is easy to make from a manufacturing standpoint. It is especially favorable if the annular groove is formed in an outer jacket face of the valve housing, because this jacket face is particularly easily machined, even though in principle it would be possible for the retaining element to be locked into an inner recess or annular groove by spreading apart with resilience directed outward.

In a further feature of the invention, it has proved favorable if the retaining element is embodied as a retaining bracket, which has at least two retaining arms beginning at a support face for the associated end of the spring, because this kind of retaining bracket can be economically stamped out of flat material, such as spring steel, and put in the desired configuration by being bent. Moreover, such a retaining bracket, depending on the intended use, may also be produced in large-scale mass production from a suitable elastic plastic.

Particular advantages are attained in a further feature of the invention in that the free ends of the retaining arms remote from the support face are provided with curved end pieces that make the retaining arms into a T-shaped form that can be locked in place in the annular groove, because this makes it possible to produce a reliable force-locking and form-fitting connection between the retaining bracket and the valve body.

As already suggested above, the retaining element is advantageously embodied as a cold-formed sheet-metal part, and in a further feature of the invention it may advantageously have three retaining arms, whose end pieces are curved in an arc in which each curved piece can be locked over a circumferential angle of virtually 120° into a recess in the form of an annular groove.

For the embodiment of the annular groove itself, it has also proved to be favorable to embody the annular groove as an undercut, with a relatively steep shoulder on the side of the undercut toward the support face of the retaining element, and on the end pieces of the retaining arms to form on a protrusion that protrudes more markedly toward the inside, merely for cooperation with this shoulder; this makes it possible to slide the retaining bracket onto the valve body without using additional aids in assembly.

In a further feature of the invention, it has also proved favorable, when a valve element in the form of a ball is used, to provide a cuplike retaining part on the side of the ball remote from the valve seat; this retaining part has a support face, embodied in particular as an annular flange, for the end of the valve spring remote from the support face of the retaining element. Another advantage to the use of such a retaining part is that a flat, centering support face can be created for the valve spring in the region of the valve bal 1, which facilitates assembly, offers greater freedom of design in terms of the diameter of the valve spring, and makes it possible to do without specially shaped and hence expensive springs, and especially conical compression springs.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
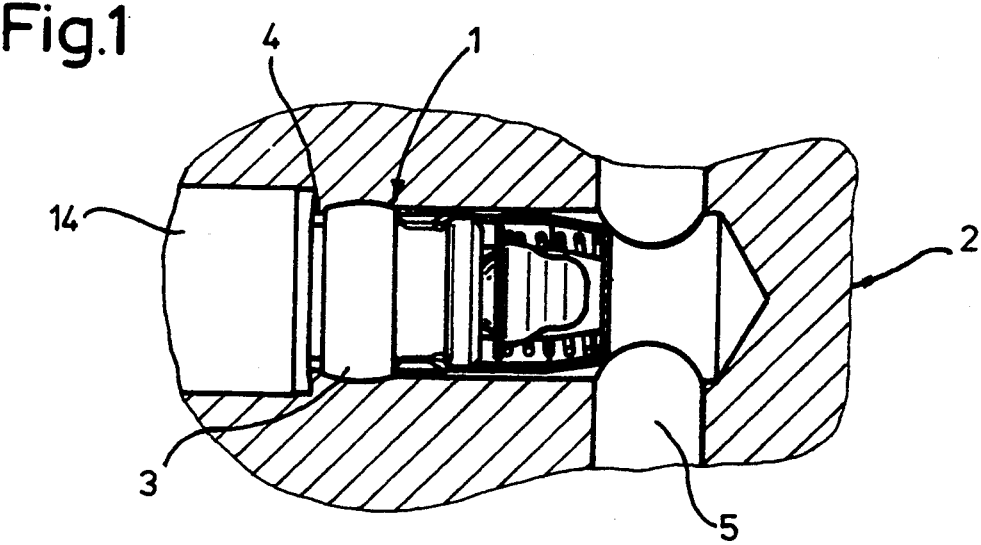
FIG. 1 is an axial longitudinal section through the check valve in the installed state in a housing.
Figure 2:
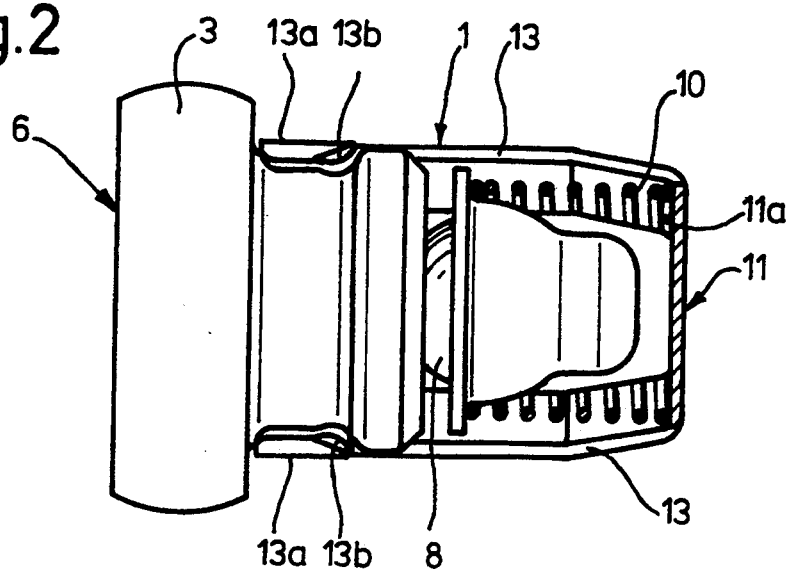
FIG. 2 is a side view of the check valve, on a larger scale, with some parts shown cutaway and other parts shown in section.

In detail, FIGS. 1 and 2 show a preferred exemplary embodiment of a check valve according to the invention, in the form of an insert check valve 1 that is press-fitted into a housing 2, and which is shown by itself in FIG. 2.

Figure 4:
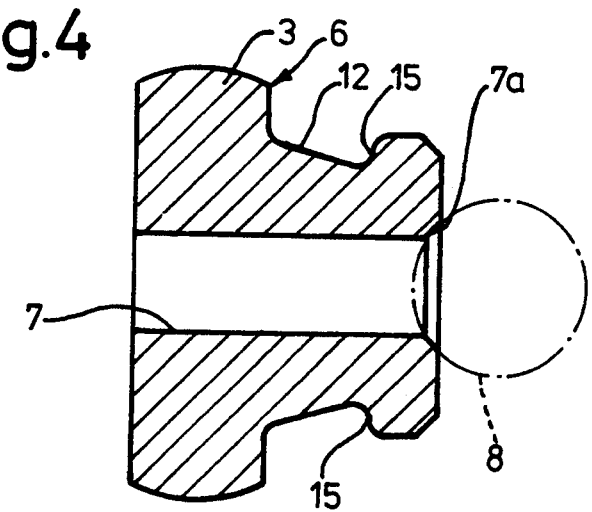
FIG. 4 is a longitudinal section through the valve body of the valve of FIG. 2.

In FIG. 2, the check valve 1 has a valve body 6, with a crowned centering collar 3 on its one end, on the left in FIGS. 1 and 2, a continuous central bore 7, and a valve seat 7a on the outlet side of the central bore 7 opposite the collar 6; see FIG. 4.

Figure 5:
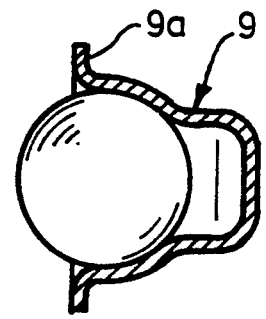
FIG. 5 shows a valve ball of the valve of FIG. 2, with an associated retaining part shown in longitudinal section.

A valve element in the form of a valve ball 8 rests sealingly on the valve seat 7a when the check valve 1 is closed. With its part remote from the valve seat 7a, the valve ball 8 is seated fittingly in a retaining part 9—see FIG. 5—which has a support face in the form of an annular flange 9a acting as a support for the one end, on the left in FIG. 2, of a valve spring embodied as a compression spring 10. The retaining part 9 in the exemplary embodiment is a cup-shaped, cold-formed sheet-metal part.

Figure 3A:
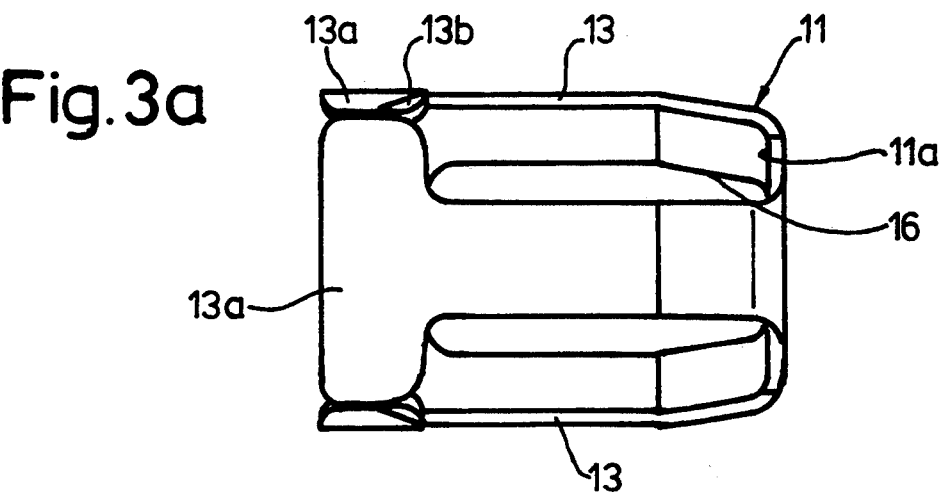
FIGS. 3a–3c show a side view, longitudinal view, and end view respectively, of a retaining bracket of the valve of FIG. 2.
Figure 3B:
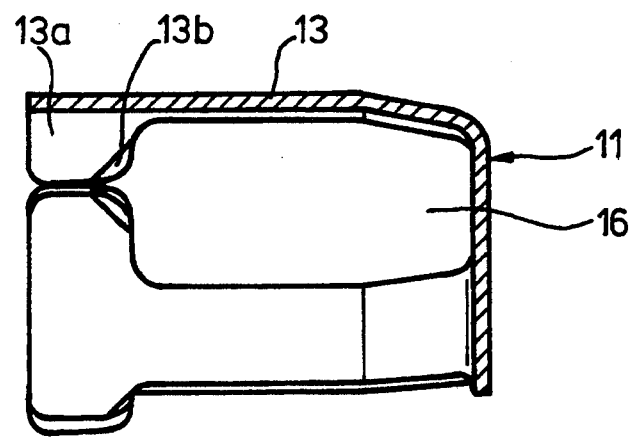
Figure 3C:
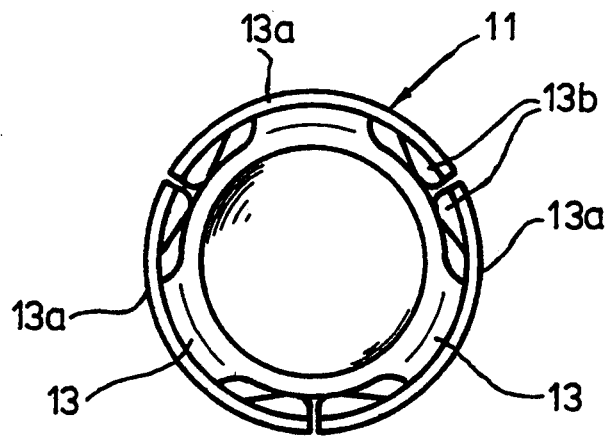

By its end remote from the retaining part 9, the compression spring 10 is supported on a support face 11a of a retaining bracket 11 acting as a retaining element, which can be locked resiliently to the valve housing 6. To that end, the retaining bracket 11, which is shown in detailed fashion in FIGS. 3a–3c, has three retaining arms 13 in this exemplary embodiment, which are embodied spring-elastically and can be locked to the valve housing 6 with a recess in the form of an annular groove 12; in an outer jacket face in the region of the right end of the valve housing 6, as seen in FIG. 2, the annular groove 12 extends parallel to the collar 3. The spring-elastic retaining arms 13, on their free ends remote from the support face 11a of the retaining bracket 11, have curved end pieces 13a, which overall lend the retaining arms 13 a T-shaped form and which in the exemplary embodiment, as is particularly clearly shown by FIG. 3a, 3b and 3d each extend over an arc of approximately 120°, such that the end pieces 13a of the three retaining arms 13 provided in the exemplary embodiment form a virtually closed ring, which is interrupted only by narrow gaps and which resiliently surrounds the valve housing 6 in the region of the annular groove 12.

As is especially clear from FIG. 4, the annular groove 12 in the exemplary embodiment is embodied as an undercut with a relatively steep shoulder 15, while on the other hand, the curved end pieces 13a of the retaining arms 13, on their ends that rest closely together in the circumferential direction, have protrusions 13b protruding radially inward, which form a more markedly inwardly drawn part of the retaining bracket 11 and are supported on the shoulder 15. This embodiment makes it easier to slide the retaining bracket 11 onto the valve housing 6 and to lock the retaining arms 13, or their end pieces 13a, to the groove 12 of the valve housing 6, so that no additional aid in assembly is necessary for the final assembly of the check valve 1.

For its intended use, the insert check valve 1 described here as an exemplary embodiment is pressed into a bore intended for that purpose in the housing 2; the crowned collar 3 then rests sealingly against the wall of the bore of the housing 2, at the rear or left end of the valve housing 6. The valve 1 fixed in the housing 2 in this way is then secured and fixed in final fashion by a mortise 4. The mortising assures that the axial retention force for the valve 1 will be increased to such an extent that the valve will be held reliably in the housing 2 even if the pressure in a chamber 5 of the housing is high.

The valve 1, fixed in the housing 2 as shown in FIG. 1, functions like a typical check valve. If a predetermined pressure is reached in a chamber 14 of a housing bore on the inlet side of the valve 1, then the ball 8 lifts away from the valve seat 7a counter to the force of the valve spring 10, so that the pressure fluid can flow through the center bore 7 of the valve body 7 and pass the ball 8, in order finally, via windows 16 defined by the interstices between the retaining arms 13, to reach the chamber 5 in the housing 2. The valve closes if the pressure in the chamber 14 drops below a predetermined value, and is pressed by an increasing pressure of the pressure fluid in the chamber 5 in an increasingly strongly sealing manner against the valve seat 7a, in order in this way to prevent the entry of pressure fluid from the chamber 5 into the chamber 14. It will be clear from the above description that a check valve according to the invention can be manufactured economically and can be reliably fixed as an insert check valve in a housing of a pressure fluid system. The valve body 6 may be produced as a simple part made on a lathe, while the retaining part or ball holder 9 and/or the retaining bracket 11 may be inexpensively embodied as cold-formed sheet-metal parts with spring-elastic properties, and are excellently well-suited for automatic delivery to the assembly line for final assembly of the valve, optionally after prior checking. The assembly of the check valve itself is then done by simply fitting the individual components into one another or locking them in place, while the installation as an insert check valve in a housing is then done by press-fitting and mortising.

From the above description, it is also clear that one skilled in the art, from the exemplary embodiment described, has numerous options available for modifications and/or additions, without having to depart from the basic concept of the invention.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A check valve for ABS and ASR applications having a valve body (6), said valve body includes a valve seat (7a) on one end and a recess embodied as an annular groove (12) in an outer jacket face of said valve housing (6), a retaining element (11) embodied as a retaining bracket, having at least two retaining arms (13) having a T-shaped form and provided with arcuate curved end pieces on free ends which extend from a support face (11a) which supports an associated end of a valve spring (10), a valve element (8) is prestressed against the valve seat by means of the valve spring, said valve spring is supported by the support face (11a) of said retaining element (11) on one end of the valve spring (10) remote from the valve element (8), said valve element is pressed by said valve spring onto said valve seat, said arcuate curved end pieces substantially defining a circle having a radius substantially complementing said annular groove, which part is inside said retaining arms (13) and adjacent to said annular groove (12), and the annular groove (12) is embodied as an undercut with a relatively steep shoulder (15) on one side of said undercut toward the support face (11a) of the retaining element (11), and for cooperation with the steep shoulder (15), a radial inward protrusion (13b) is formed arcuate on the curved end pieces (13a) of the retaining arms (13) and protrude inwardly in said annular groove (12) and toward said steep shoulder to resiliently lock said retaining element onto said valve body.

2. A check valve as defined by claim 2, which includes a valve element in a form of a ball (8), a cup-shaped retaining part (9) with a support face (9a) for the valve spring (10) is provided on a side of the ball remote from the valve seat (7a).

3. A check valve as defined by claim 2, which the retaining element (11) and the cup-shaped retaining part (9) are embodied as a cold-formed sheet-metal part.

4. A check valve as defined by claim 1, in which the retaining element (11) is embodied as a cold-formed sheet-metal part.

5. A check valve as defined by claim 1, in which the cup-shaped retaining part (9) is embodied as a cold-formed sheet-metal part.

6. A check valve as defined by claim 1, in which said valve body (6) includes a centering collar (3) having a surface, which is curved to seat within a housing (2).

* * * * *